United States Patent
Hansen

[15] 3,678,555
[45] July 25, 1972

[54] METHOD FOR CONNECTING COOLED OR UNCOOLED ROTOR BLADES TO THE BLADE RIM OF AN ASSOCIATED DISC

[72] Inventor: Wolfgang Hansen, Krailling near Starnberg, Germany

[73] Assignee: Motoren-und Turbinen-Union Munchen GmbH, Munich, Germany

[22] Filed: Nov. 16, 1970

[21] Appl. No.: 89,561

[30] Foreign Application Priority Data

Nov. 15, 1969 Germany ............... P 19 57 614.8

[52] U.S. Cl. .................... 29/156.8 R, 29/482, 416/213
[51] Int. Cl. ................................. B23k 1/20, B23p 1/26
[58] Field of Search ........... 29/156.8 B, 156.8 H, 156.8 P, 29/156.8 R, 482; 416/213

[56] References Cited

UNITED STATES PATENTS

| | | |
|---|---|---|
| 1,470,506 | 10/1923 | Steenstrup .................. 29/156.8 R |
| 1,732,234 | 10/1929 | Jensky ........................ 29/156.8 B |
| 2,063,706 | 12/1936 | Soderberg .................... 29/156.8 b |
| 2,559,013 | 7/1951 | Eastman et al. ............... 29/156.8 R |
| 2,767,460 | 10/1956 | Schultz ....................... 29/156.8 R |
| 3,120,697 | 2/1964 | Zingsheim .................... 29/156.8 B |

Primary Examiner—John F. Campbell
Assistant Examiner—Donald C. Reiley, III
Attorney—Craig and Antonelli

[57] ABSTRACT

A method for connecting cooled or uncooled rotor blades to the disc rim of an associated disc, especially for gas turbine engines with a high shaft speed, in which each rotor blade is provided with a triangular segment — as related to the plane of the disc rim surface — forming the blade root. For assembly, two segments having collars on opposite sides bent so as to embrace the face edges of the disc rim are placed onto the rim from both sides in such a manner that the longest faces of the two segments will coincide and contact each other on the surface of the blade rim. The segments then will be welded together in this area, forming a pair of blades which encloses the surface of the disc rim as well as its edges.

10 Claims, 4 Drawing Figures

PATENTED JUL 25 1972 3,678,555

INVENTOR
WOLFGANG HANSEN

BY Craig, Antonelli, Stewart & Hill
ATTORNEYS

METHOD FOR CONNECTING COOLED OR UNCOOLED ROTOR BLADES TO THE BLADE RIM OF AN ASSOCIATED DISC

BACKGROUND OF THE INVENTION

The present invention relates to a method for connecting cooled or uncooled rotor blades to the disc rim of an associated disc, especially for gas turbine engines with a high shaft speed.

In a gas turbine engine, liquid or gaseous fuels are burned and the combustion gases are then routed through one or more bladed turbine wheels in order to produce thrust or shaft power. The design of the blade as well as the temperature of the gas entering the turbine blading have a decisive effect on the efficiency of this cycle. Higher efficiencies, i.e. a lower specific fuel consumption, can be achieved by increasing the gas temperature. Finally, however, the gas temperature limit will be determined by the properties of the blade materials used, the strength of which decreases with increasing operating temperatures.

Today and in the foreseeable future, nickel and cobalt alloys will dominate the turbine blade field. With these materials, operating temperatures of engine components of up to approximately 1,050° C can be mastered. Higher temperatures, however, are only feasible when using internally cooled blades. These high-temperature alloys used in the manufacture of turbine blades, however, present considerable difficulties with respect to forming. Thus, it has become a widely accepted practice to produce these blades as castings. In addition, high-temperature materials for blades have, as compared to forgeable alloys, the serious disadvantage of being brittle and thus susceptible to cracks and notches. In design work, this disadvantage has to be taken into account, and the use of high-temperature alloys is then confined to those areas of the gas turbine engine where high-temperature properties are the major requirement.

With gas turbine engines featuring a higher output, i.e. more than 500 HP, it has become standard practice to manufacture the turbine rotor blades separately and to install them in the turbine discs upon engine assembly. With this method, there are various possibilities of shaping the blade root, e.g. the fir-tree, T-root shape or the like. In this case, the turbine discs have an operating temperature which is considerably lower than that of the blade aerofoils and can be produced from a tough, forgeable alloy of high strength. The above-mentioned blade root shapes such as fir-tree and T-root require, however, a rather complicated and thus expensive manufacture of the blades which will apply especially to those cases where the blades are to be cooled in order to permit a high gas turbine inlet temperature, i.e. where the blade root will, in addition, be provided with holes or passages through which the collant is routed to the hollow blade aerofoil or to cooling passages arranged inside the aerofoil.

Especially with gas turbine engines of lower output and of high shaft speeds (40,000 rpm and above), it has been found thAt the above-mentioned blade root shapes can lead to blade failures and thus to damage of the rotor, due to the strong centrifugal forces acting upon the blades and the material stresses caused thereby. Moreover, the use of rotor blades with the above-mentioned root shapes in small gas turbines will present considerable machining difficulties since, due to the relatively small diameter of the rotor discs, the form tolerances of the small parts will become extremely close.

The above-discussed problems necessitated the introduction of the "integrally cast turbine wheels" where blades and disc form an integral casting. If a rotor manufactured in this way is to be used in the hot section of gas turbine engine, only a high-temperature blade material can be employed as casting material which, however, due to its brittleness, has the disadvantage of being susceptible to cracks and notches. This will frequently lead to blade failures, especially in the blade root area. Moreover, some manufacturing difficulties will be encountered if such turbine discs and their blading are to be provided with cooling passages.

SUMMARY OF THE INVENTION

The present invention aims to eliminate the aforementioned disadvantages of the known methods of connecting blade roots and rotor disc and to provide a positive, reliable connection between the rotor blades and their associated disc, which require reasonable manufacturing efforts. This aim applies even to cases where it shall be possible to route a cooling agent to the rotor blades through the disc, if required.

In addition, the present invention aims to enable the selection of suitable blade and disc materials in accordance with the operating conditions to be expected for a gas turbine engine.

The foregoing problems have been solved in accordance with the present invention by providing a manufacturing method for connecting cooled or uncooled rotor blades to the rim of an associated disc, in which each rotor blade is provided with a triangular (as related to the plane of the disc rim surface) segment, forming the blade root. For assembly, in each case two segments having, on opposite sides, collars bent so as to embrace the front and rear face edges, respectively, of the disc rim, are placed onto the rim from both sides in such a manner that the longest faces of the two segments will coincide and contact each other on the surface of the blade rim. The segments then will be welded together in this area, thus forming a pair of blades which encloses the surface of the disc rim as well as its edges.

A suitable method for connecting two triangular-shaped segments to each other is the electron-beam welding process.

After the first pair of blades has been welded at its segments, the runout of the weld seam can be used for tack-welding the next segment fitted on the disc rim. The remaining transverse joints between the segments of two adjacent pairs of blades can be left unwelded in order to compensate for differences in expansion of the blades and of the wheel disc caused by different temperature effects acting on the blades and on the wheel disc. Furthermore, the respective electron-beam weld may also be used for providing a connection between the welded segments and the disc rim. For the connection of the last pair of blades to the disc rim, it will be desirable to manufacture the respective segments either oversize or as selective fit. In case of manufacturing oversize, it will be required to grind the segments to the dimension of the gap which remains open for the assembly of the last pair of blades on the disc rim. This fitting operation of the segment which form the last pair of blades is mainly necessitated by the variation in the amount of shrinkage resulting from the preceding welding operation.

For final fastening of the segments, which carry the rotor blades, to the disc rim, it is proposed in the present invention to provide the wheel disc in the rim area on both sides with recesses, which are arranged coaxially to the longitudinal centerline of the wheel disc and which are filled up with rings of braze. When all rotor blades have been fitted to the disc rim, the bladed wheel disc is to be heated in a furnace so that the previously inserted rings of brazing material will melt and fill up the brazing joints formed between the disc rim and the segment collars.

In cases where rotor blades are arranged coaxially to the wheel axis and feature platforms forming a circumferential collar or blade root segments which are designed for fitting into individual recesses in the disc rim or into a groove in the rim for insertion of all blades, a further embodiment of the present invention provides that each triangular segment shall form a separate part with respect to the rotor blade and shall, prior to be fitting onto the disc rim, be provided with an opening corresponding to the respective blade shape, thus enabling the segment to tightly enclose the circumferential collar or blade root segment of a rotor blade inserted or to be inserted into the disc rim.

This type of connection between rotor blades and rotor disc is suited for the application of novel blade materials, especially for small gas turbines with high shaft speed. In this case, for example, blade material combinations consisting of filament-type support material with a matrix-type filler material or blades made from sintered material are feasible. Also in the solution according to the present invention, in each case two triangular segments are needed to form a pair of blades and are fitted onto the disc rim in the manner described above. They are connected to each other by beam welding and thereafter, that is as soon as the rotor has been completely bladed, the final attachment of the rotor blades and their associated segments to the rim can be effected by melting of the braze material rings embedded in the disc rim.

BRIEF DESCRIPTION OF THE DRAWING

These and further aims, features and advantages will become more apparent from the following description when taken in conjunction with the accompanying drawing which shows, for purposes of illustration only, several embodiments in accordance with the present invention and wherein.

DETAILED DESCRIPTION OF THE DRAWING

Figure 1:
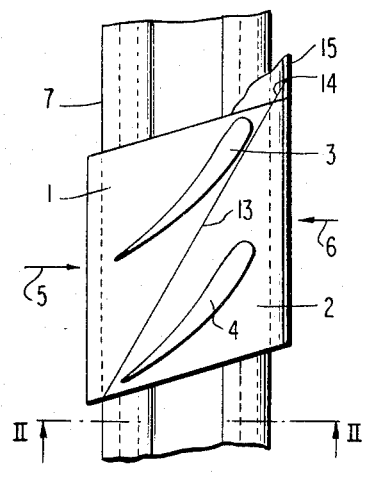
FIG. 1 illustrates a first embodiment of a rotor wheel section with an attached pair of rotor blades as seen from above in accordance with the present invention.

Referring now to the drawing and, in particular, to FIG. 1, a pair of blades is in each case formed by two triangular segments 1, 2 of essentially the same area and the blades 3, 4 attached to them. Segments 1, 2 are fitted to disc rim 7 of wheel disc 8 (shown as broken cut-out view) in the direction of arrow 5, 6. The laterally bent-down collar 9, 10 of segments 1, 2 embrace the rounded off face edges 11, 12 and also their respective part of the faces of wheel disc 8, which taper to the inside on both sides. Segments 1, 2 are welded to each other along line 13 as shown in FIG. 1. As shown by the extension 14 of line 13, the runout of the weld seam can be used for tack-welding the next segment 15 to be placed onto the disc rim.

Figure 2:
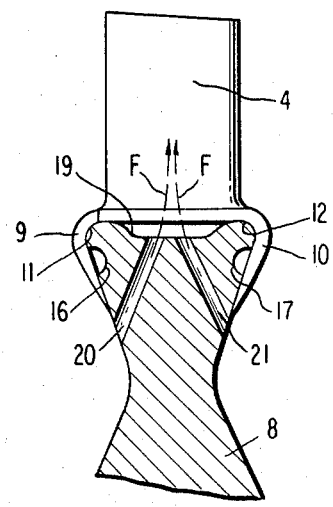
FIG. 2 is a sectional view along line II — II of FIG. 1.

As can be further seen from FIG. 2, braze rings 16, 17 are inserted in disc rim 7, which, when being melted, provide a connection between segments 1, 2 and disc rim 7 within the area of collars 9, 10 embracing the rim. During the fusion process, any gaps existing between disc rim 7 and collars 9, 10 are also filled up by the melting braze. Furthermore, FIG. 2 shows a recess 19 in the disc rim arranged coaxially to the wheel axis of the wheel disc, to which the compressor bleed air of a gas turbine engine (not illustrated) can be directed via passages 20, 21 of wheel disc 8. This bleed air is then routed through rotor blades 3, 4 for the cooling thereof (arrows F).

Figure 3:
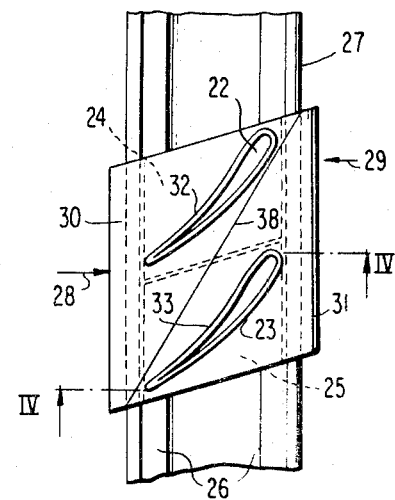
FIG. 3 illustrates a second embodiment of a rotor wheel section with an attached pair of rotor blades as seen from above in accordance with the present invention.
Figure 4:
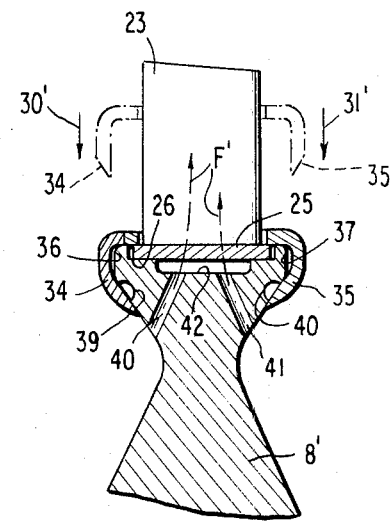
FIG. 4 is a sectional view along line II — II of FIG. 3.

In FIGS. 3 and 4, an embodiment of the present invention with the use of rotor blades 22, 23 is shown, wherein the rotor blades are provided with flat blade root platforms 24, 25 to be inserted in a circumferential groove 26 of disc rim 27. The triangular segments 30, 31 placed onto disc rim 27 in the direction of arrows 28, 29 having openings 32, 33 adapted to the respective blade contour in the area of the blade root, thus enclosing blades 22, 23 as well as their platforms 24, 25.

Thus, two methods of assembly are provided, i.e. rotor blades 22, 23 can be inserted through openings 32, 33 of segments 30, 31 prior to placing the latter on the disc rim 27 or rotor blades 22, 23 can first be inserted into groove 26 at their desired distances and segments 30, 31 can be fitted afterwards by sliding them with their openings 32, 33 over rotor blades 22, 23 in the direction of arrows 31', 31'. With this latter method, collars 34, 35 can be bent inwards for embracing face edges 36, 37 of disc rim 27 after rotor blades 22, 23 have been inserted into groove 26.

After two rotor blades 22, 23, including their segments 30, 31 have been placed onto disc rim 27, segments 30, 31 are welded together along line 38. As soon as the remaining rotor blades have been fastened to disc rim 27 in the manner described above, the final fastening of segments 30 31 as well as of all other segments (not shown) to disc rim 27 is again effected by melting the braze rings embedded in recesses 39, 40 of disc rim 27.

In order to achieve, in addition to an intensive cooling of the rotor blades, an intensive cooling of the blade platforms 24, 25 associated with the respective rotor blades 22, 23, a further recess 42 has been provided in disc rim 27. It is located under the blade platform and cooling air can be routed to it via passages 40, 41 of wheel disc 8'. This cooling air then passes in the direction of arrows F' into the rotor blades, e.g. into and through rotor blade 23.

Moreover, the present invention can also be used for rotor blades featuring a root profile in the form of a short platform which can be inserted into correspondingly shaped recesses equally spaced over the circumference of the disc rim (not shown). Thus, while I have shown and described several embodiments in accordance with the present invention, it is to be clearly understood that the same is susceptible of numerous changes and modifications as will be apparent to one skilled in the art, and I, therefore, do not wish to be limited to the details shown and described herein but intend to cover all such changes and modifications as are encompassed by the scope of the present invention.

I claim

1. Method for connecting rotor blades to the rim of an associated disc, especially for gas turbine engines with a high shaft speed, wherein each rotor blade has a triangular segment, as related to the plane of the disc rim surface, forming the blade root and having a collar bent so as to embrace a face edge of the disc rim, comprising putting two triangular segments on the disc rim from the front and rear sides of the disc rim to embrace the front and rear face edges thereof by the collars on opposite sides in such a manner that the longest faces of the two triangular segments coincide; contacting the longest faces of the two segments to each other on the surface of the blade rim; and weld-ing the longest faces together, whereby a pair of blades are formed which encloses the disc rim on its surface as well as in the region of the face edges.

2. Method according to claim 1, characterized in that recesses are provided in the area of the disc rim and are arranged on both sides thereof coaxially to the longitudinal axis of the disc for receiving braze rings, and further including the step of heating up the disc after all rotor blades have been fitted to the disc rim so that the braze rings, previously inserted in the recesses, will melt, thereby filling up brazing joints formed between the disc rim and the segment collars.

3. Method according to claim 1, characterized in that the rotor blades have a platform forming a circumferential collar or with blade root segments, and further including the step of inserting each rotor blade in the disc rim for insertion of all blades and providing, prior to being put on the disc rim, each triangular segment with an opening corresponding to the respective blade shape, thereby enabling the same to tightly enclose the platform or the blade root segment of the rotor blade as well as the rotor blade.

4. Method according to claim 3, characterized in that recesses are provided in the area of the disc rim and are arranged on both sides thereof coaxially to the longitudinal axis of the disc for receiving braze rings, and further including the step of heating up the disc after all rotor blades have been fitted to the disc rim so that the braze rings, previously inserted in the recesses, will melt, thereby filling up brazing joints formed between the disc rim and the segment collars.

5. Method according to claim 3, wherein the blades are inserted into individual recesses in the disc rim.

6. Method according to claim 3, wherein the blades are inserted into a groove in the disc rim.

7. Method according to claim 4, wherein the segment tightly encloses the platform or the root blade segment of the rotor blade inserted in the disc rim.

8. Method according to claim 4, wherein the segment tightly encloses the platform or the root blade segment of the rotor blade to be inserted into the disc rim.

9. Method according to claim 1, wherein the rotor blades are adapted to be cooled.

10. Method according to claim 1, wherein the rotor blades are adapted to be uncooled.

* * * * *